(12) United States Patent
Korya et al.

(10) Patent No.: US 8,506,746 B2
(45) Date of Patent: Aug. 13, 2013

(54) METHOD OF FORMING A JOINT

(75) Inventors: Chetan Korya, Bristol (GB); Timothy Sanderson, Bristol (GB)

(73) Assignee: Airbus Operations Limited, Bristol (GB)

(*) Notice: Subject to any disclaimer, the term of this patent is extended or adjusted under 35 U.S.C. 154(b) by 121 days.

(21) Appl. No.: 13/064,474

(22) Filed: Mar. 28, 2011

(65) Prior Publication Data
US 2011/0240200 A1    Oct. 6, 2011

(30) Foreign Application Priority Data
Mar. 30, 2010 (GB) .................................. 1005272.8

(51) Int. Cl.
F16B 11/00 (2006.01)
B32B 37/06 (2006.01)
B05D 3/06 (2006.01)

(52) U.S. Cl.
USPC ....................... 156/272.2; 403/270

(58) Field of Classification Search
USPC ............ 156/60, 272.2, 272.8, 349; 403/270; 427/596
See application file for complete search history.

(56) References Cited

U.S. PATENT DOCUMENTS

| | | | | |
|---|---|---|---|---|
| 5,512,162 A | * | 4/1996 | Sachs et al. | 205/91 |
| 5,863,635 A | * | 1/1999 | Childress | 428/119 |
| 2003/0066589 A1 | * | 4/2003 | Benson et al. | 156/92 |
| 2005/0103765 A1 | * | 5/2005 | Kawasaki | 219/121.85 |

FOREIGN PATENT DOCUMENTS

| | | |
|---|---|---|
| EP | 1 707 702 | 10/2006 |
| EP | 2 108 503 | 10/2009 |
| GB | 2 334 914 | 9/1999 |
| JP | 06-031816 | 2/1994 |
| JP | 06031816 A * | 2/1994 |

OTHER PUBLICATIONS

Machine Translation of JP 06031816 A, Feb. 1994.*
Great Britain Search Report for GB Application No. 1005272.8, dated Jul. 23, 2010.

* cited by examiner

Primary Examiner — Daniel McNally
(74) Attorney, Agent, or Firm — Nixon & Vanderhye P.C.

(57) ABSTRACT

A method of forming a joint between a first component and a second component, the first component comprising a plurality of layers of fibers impregnated with a thermosetting matrix. A welding interface element is provided with an array of pointed prongs. One or more of the layers of fibers are penetrated with the prongs, either before or after the fibers have been impregnated with the thermosetting matrix. The first component is cured by heating the thermosetting matrix after the prongs have been embedded. A thermoplastic weld is formed between the second component and the welding interface element.

17 Claims, 8 Drawing Sheets

METHOD OF FORMING A JOINT

This application claims priority to Great Britain Application No. 1005272.8, filed 30 Mar. 2010, the entire contents of which is hereby incorporated by reference.

FIELD OF THE INVENTION

The present invention relates to a joint, and to a method of forming a joint between a first component and a second component, the first component comprising a plurality of layers of fibres impregnated with a thermosetting matrix.

BACKGROUND OF THE INVENTION

Joints with a thermosetting composite component are conventionally formed by fasteners such as bolts and rivets. This results in the composite component having to be larger than would otherwise be necessary to take into account the weak points introduced by the fastener holes. Also, the components of the joint must be measured and/or manufactured with close tolerances so that they mate together precisely at the joint.

SUMMARY OF THE INVENTION

A first aspect of the invention provides a method of forming a joint between a first component and a second component, the first component comprising a plurality of layers of fibres impregnated with a thermosetting matrix, the method comprising:
 a. providing a welding interface element with an array of pointed prongs;
 b. penetrating one or more of the layers of fibres with the prongs, either before or after the fibres have been impregnated with the thermosetting matrix,
 c. curing the first component after step b. by heating the thermosetting matrix; and
 d. forming a thermoplastic weld between the second component and the welding interface element.

A second aspect of the invention provides a joint comprising:
 a first component comprising a plurality of layers of fibres impregnated with a thermosetting matrix;
 a welding interface element with an array of pointed prongs embedded within the first component; and
 a second component welded to the welding interface element by a thermoplastic weld.

By adapting the welding interface element to the thickness and shape of the two components, measurement and detailed manufacturing of bespoke parts is no longer required. The pointed prongs provide a high peel strength joint between the welding interface element and the first component.

The first component may be manufactured by forming a stack of plies of "prepreg", each ply comprising a layer of fibres pre-impregnated with a thermosetting matrix. In this case the plies may be pushed one-by-one onto the prongs as the stack is laid up, or the prongs may be pushed into a previously formed stack of plies. Alternatively the first component may be manufactured by forming a series of layers of "dry-fibre", and subsequently infusing the dry fibre with the matrix. In this case the prongs may penetrate the layer(s) of fibre either before or after the infusion step.

Each layer of fibres may comprise a set of parallel fibres all running in the same direction, or a more complex structure such as a woven or knitted structure.

The thermoplastic weld may be formed in step d. of the method before the fibre layers are penetrated in step b. However more preferably step d. is performed after step b.

The welding interface element preferably comprises a welding pad with a substantially planar welding face; and the thermoplastic weld only extends across part of the welding face. This enables a certain amount of play between the two components.

Typically the welding interface element comprises a welding pad which is welded to the second component. The prongs and the welding pad may formed from different materials or more preferably from the same thermoplastic material. The welding interface element may or may not be fibre-reinforced.

A heating element, such as a coil or series of wires, may be embedded within the joint proximate the thermoplastic weld. The heating element may be activated by a direct electrical connection (e.g. a wire connected to the coil) or by a wireless inductive connection. Alternatively the weld may be formed by ultrasonic welding.

The prongs may have a simple triangular or conical profile, or at least one of the prongs may have a transverse cross-sectional area which increases from the tip of the prong to form a pointed head, and then decreases to form an undercut face. The prongs may push aside fibres as they pierce the fibre layer(s), and then the fibres spring back behind the undercut face. The undercut face can thus increase the pull-through strength of the joint. Alternatively the prongs may cut the fibres as they pierce the fibre layers.

The array of pointed prongs may be grown in a series of layers by additive fabrication, each layer being grown by directing energy and/or material from a head to selected parts of a build surface. For instance each prong may be grown by building up a series of layers of fused thermoplastic powder.

The head and the build surface may remain stationary during the growth process: for example the head may have a fixed array of lasers and/or nozzles which extend over the entire build surface and are modulated as required to directing energy and/or material to selected parts of the build surface. However more preferably the method further comprises causing relative movement between the head and the build surface. Preferably this relative movement is caused by moving the head, but it will appreciated that the relative movement may be caused by moving the component or by a combined movement of both parts.

Various additive fabrication techniques may be used, including techniques in which the head directs material to selected parts of the build surface, and techniques in which a series of beds of material are deposited on the build surface and the head directs energy to selected parts of each bed.

Examples of the former include fused deposition modelling (in which the head extrudes hot plastic through a nozzle) and powder feed fabrication (in which a laser beam directs energy to fuse a powdered material as it is delivered to the build surface). Advantages of these methods are that:
 the amount of wastage of material in the fabrication process is minimized;
 the prongs can be made from a different material to the rest of the welding interface element; and
 the welding interface element can be rotated relative to the head during the fabrication process in order to form a complex shape.

Examples of the latter include powder bed fabrication (in which a series of beds of thermoplastic powder are deposited on the build surface and selected parts of each bed are fused by a laser). Advantages of using the head to deliver energy to the selected parts of a previously deposited bed of material are that:

it enables the welding interface element and the array of prongs to be formed together from the same material; and unconsolidated parts of each bed can support successive beds, enabling relatively complex shapes to be formed.

Typically the prongs are formed by fusing a thermoplastic powder, for instance in a powder bed process or a powder feed process as described above.

A further aspect of the invention provides a welding interface element comprising a welding pad with a welding face on a first side of the welding pad; and an array of pointed prongs which extend from a second side of the welding pad opposite the first side, wherein the welding pad and the prongs are formed from the same thermoplastic polymer material, and wherein the distance between the first and second sides of the welding pad varies across the welding pad.

A further aspect of the invention provides a method of manufacturing a welding interface element, the welding interface element comprising a welding pad with an array of pointed prongs, wherein the welding pad and the prongs are formed from the same thermoplastic polymer material, the method comprising growing the welding pad and the array of pointed prongs in a series of layers by additive fabrication, each layer being grown by directing energy and/or material from a head to selected parts of a build surface.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
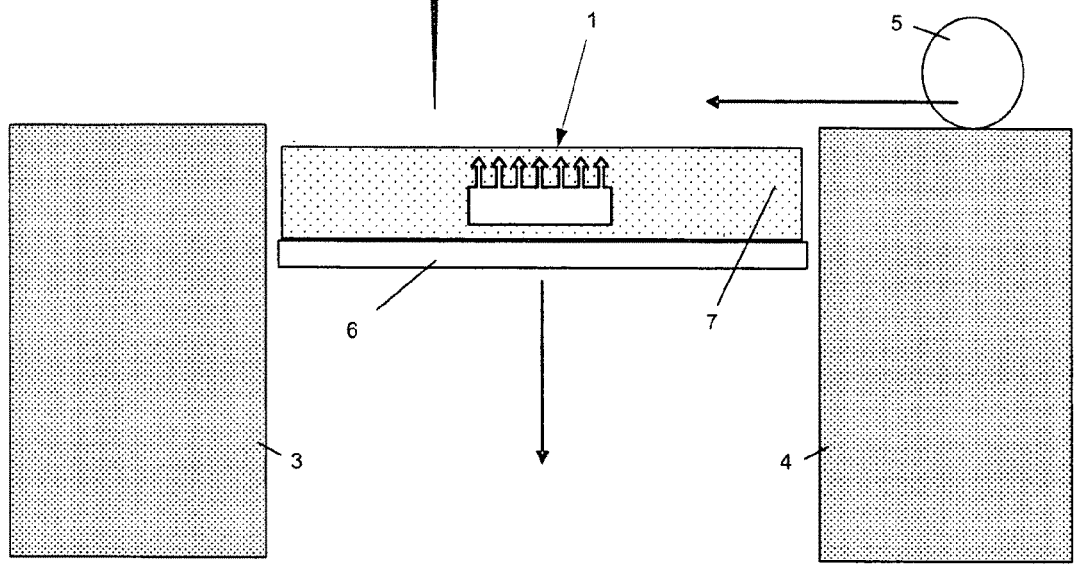
FIG. 1 illustrates a powder bed additive method of manufacturing a welding interface element.

A method of forming a joint between a rib and a wing skin is shown in FIGS. 1-5. A welding interface element 1 is first manufactured by the powder-bed system illustrated in FIG. 1. The element 1 is formed by scanning a laser head 2 laterally across a powder bed and directing the laser to selected parts of the powder bed. More specifically, the system comprises a pair of feed containers 3, 4 containing powdered thermoplastic material such as polyetheretherketone (PEEK) or polyphenyline sulphide (PPS). A roller 5 picks up powder from one of the feed containers (in the example of FIG. 1, the roller 5 is picking up powder from the right hand feed container 4) and rolls a continuous bed of powder over a support member 6. The laser head 2 then scans over the powder bed, and a laser beam from the head is turned on and off to melt the powder in a desired pattern. Movement of the laser head 2 and modulation of the laser beam is determined by a Computer Aided Design (CAD) model of the desired profile and layout of the part.

The support member 6 then moves down by a small distance (typically of the order of 0.1 mm) to prepare for growth of the next layer. After a pause for the melted powder to solidify, the roller 5 proceeds to roll another layer of powder over support member 6 in preparation for the next step. Thus as the process proceeds, a fused part 1 is constructed, supported by unconsolidated powder parts 7. After the part has been completed, it is removed from the support member 6 and the unconsolidated powder 7 is recycled before being returned to the feed containers 3, 4.

Figure 2:
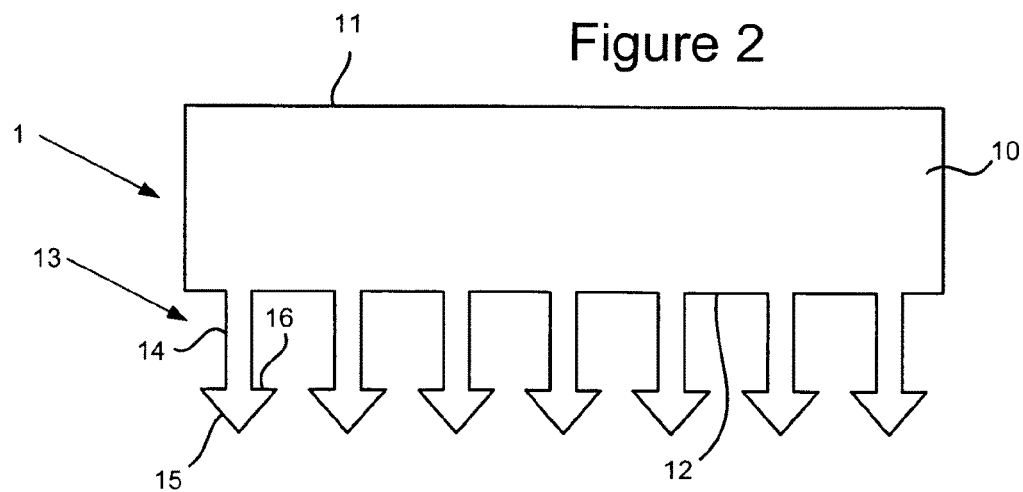
FIG. 2 is a side view of a welding interface element manufactured by the method of FIG. 1.

Referring to FIG. 2, the welding interface element 1 comprises a welding pad 10 with a substantially planar welding face 11, and a second face 12 (which may or may not be planar) which is opposite to the welding face 11 and carries an array of pointed prongs 13. Each prong 13 has a shaft 14 at right angles to the second face 12, and a pointed head 15 with an undercut face 16. The transverse cross-sectional area of each prong increases from the tip of the prong to form the pointed head 15, and then decreases to form the undercut face 16.

The powder bed system of FIG. 1 can be used to construct the entire element 1 (including the prongs 13) as a single piece.

Figure 3:
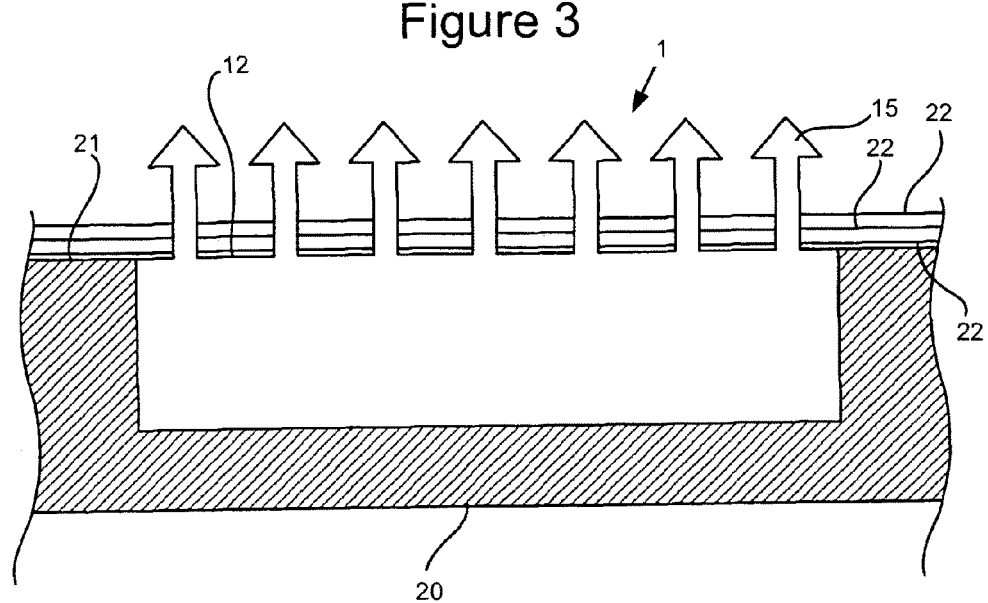
FIG. 3 is a sectional view of an aircraft wing cover being laid up on a mould tool.
Figure 4:
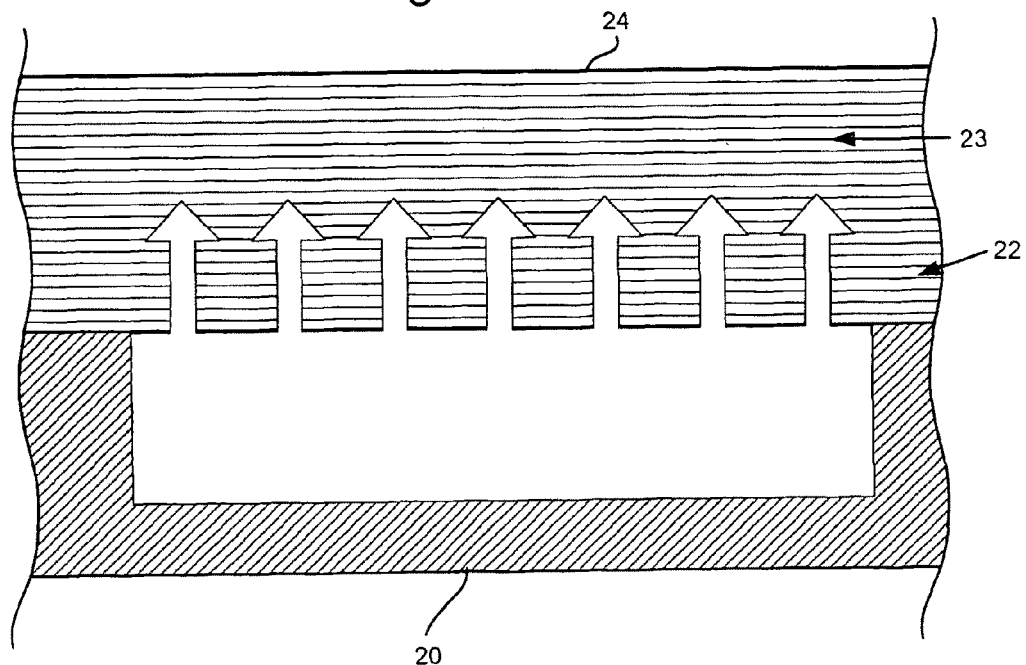
FIG. 4 is a sectional view of the fully laid up and cured wing cover.

The welding interface element 1 is then placed within a recess of a moulding tool 20 as shown in FIGS. 3 and 4, with the second face 12 lying flush with a mould surface 21 of the moulding tool 20.

A series of prepreg plies 22 is then laid one-by-one onto the mould surface 21 of the mould tool. Each ply of prepreg comprises a layer of unidirectional carbon fibres impregnated with a thermosetting epoxy resin matrix.

FIG. 3 shows the process after three prepreg plies 22 have been laid. The plies 22 are pushed onto the array of upwardly directed prongs 13 so that the prongs pierce the prepreg. The prepreg is then pushed down fully until it engages the preceding layer.

FIG. 4 shows the full stack of plies. Note that the length of the prongs is less than the thickness of the stack so the upper prepreg layers 23 are not pierced by the prongs 13. That is, the prongs only partially penetrate the prepreg stack so that the tips of the prongs are embedded within the stack. The stack is then cured by heating to approximately 180° C. to form a cured part 24 shown in FIG. 4.

Figure 5:
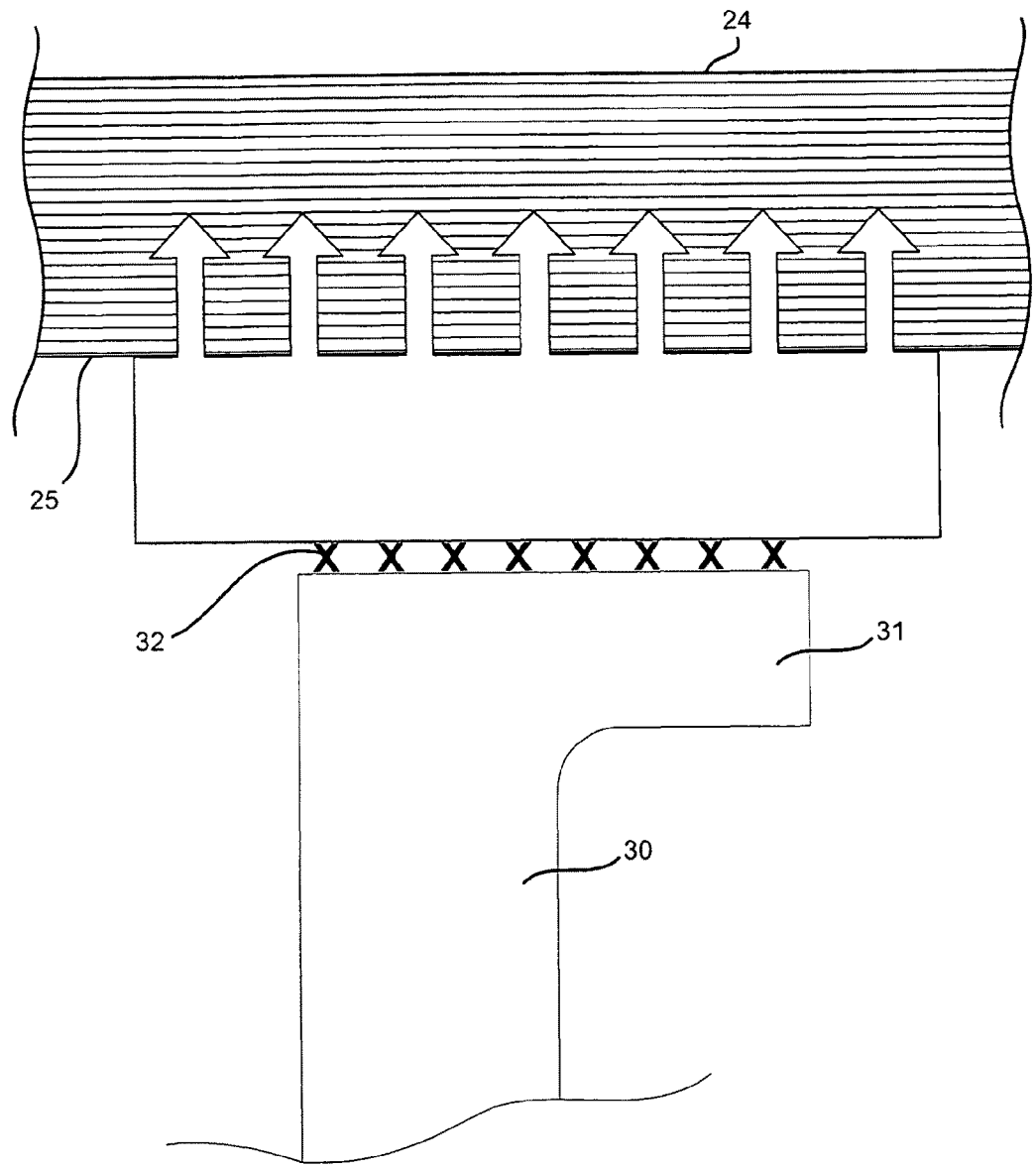
FIG. 5 is a sectional view of a thermoplastic rib flange being welded to the wing cover.
Figure 6:
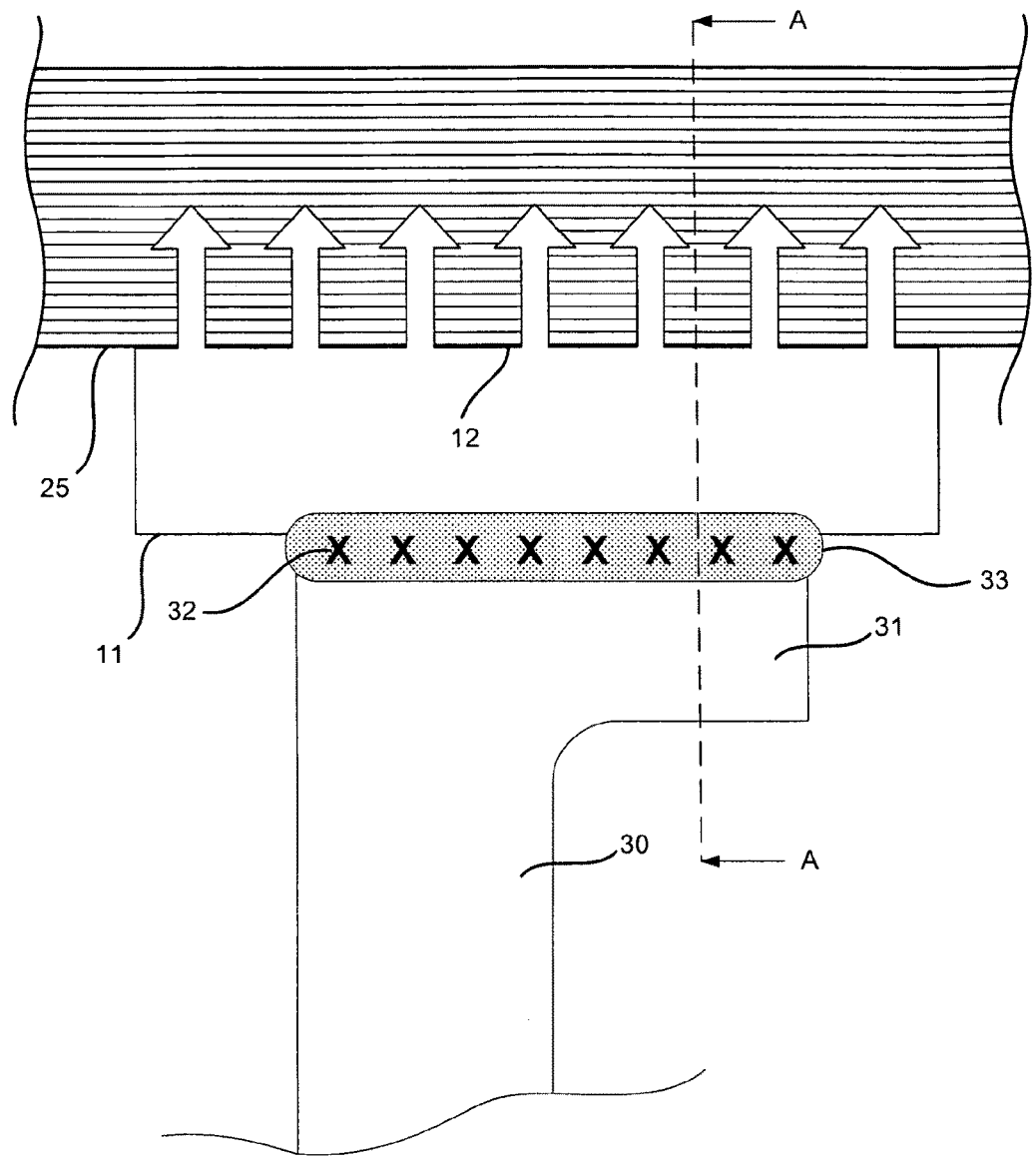
FIG. 6 is a sectional view of the joint formed by the welding process.

Next, a rib is welded to the wing skin 24 by the process shown in FIGS. 5 and 6. The rib comprises a web 30 and a flange 31. The web 30 and flange 31 are formed integrally by press forming from a thermoplastic material. The thermoplastic material is reinforced by a carbon fabric (not shown).

An array of heating elements, indicated schematically in FIGS. 5 and 6 by a line of crosses 32, is placed between the welding interface element and the flange 31. In the example shown in FIGS. 5 and 6 the heating elements 32 are a loose item which is placed between the components when it is assembled. Optionally the heating elements 32 can be tack welded to either the welding interface element or more preferably to the flange 31 prior to assembly, by heating the thermoplastic locally with the heating elements 32 to hold them in position during installation of the rib.

The heating elements 32 are then activated to form a thermoplastic weld 33 between the rib flange 31 and the welding interface element 1 as shown in FIG. 6. The heating elements 32 melt the welding face 11 of the welding pad and the upper face of the rib flange 31, the melted surfaces coalescing to form a pool of molten material that cools to become a strong joint. Note that the heating elements 32 remain embedded within the thermoplastic weld 33 after the joint is formed. The components may also be pressed together during heating in order to ensure the strength of the joint.

Note that the planform area of the welding face 11 is greater than the planform area of the heating elements 32, so the weld 33 only extends across part of the welding face 11. This enables a certain amount of horizontal "play" between the rib and the welding pad.

Figure 7:
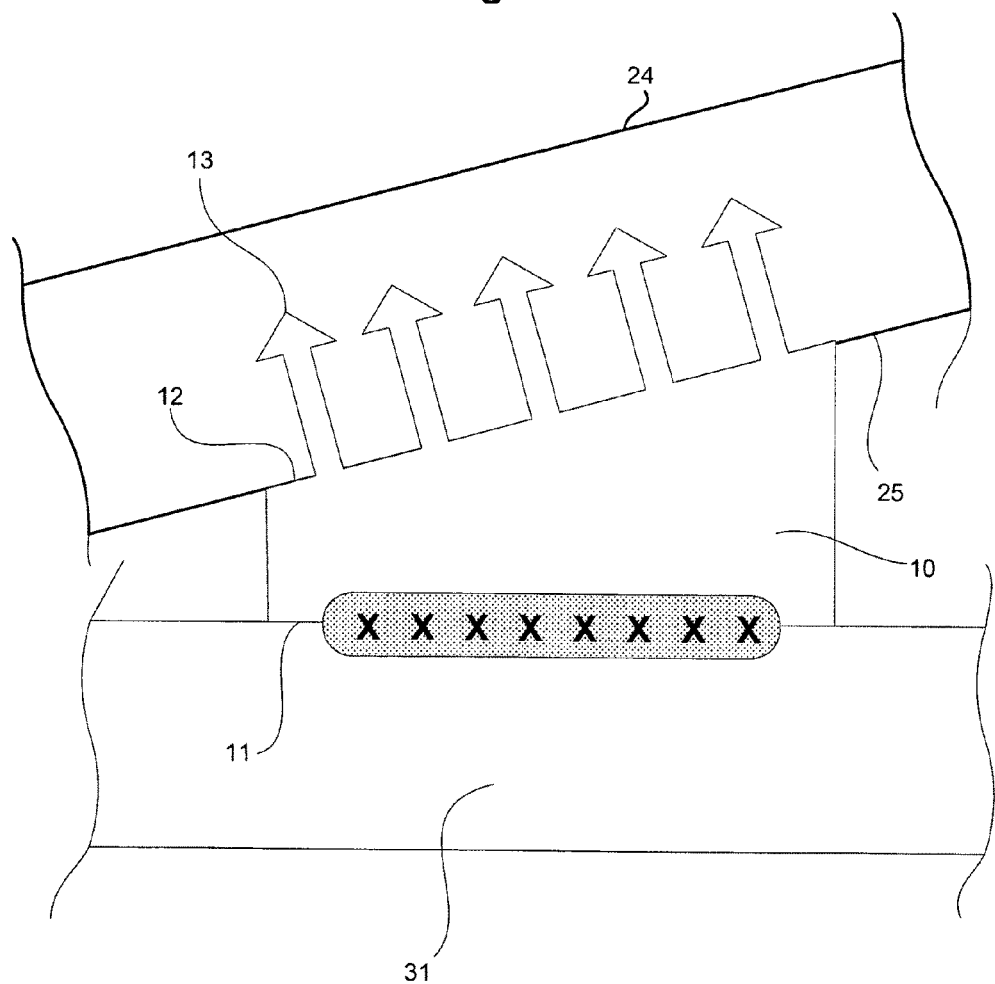
FIG. 7 is a section taken along a line A-A in FIG. 6.

FIG. 6 is a span wise section across the joint, in other words the span of the wing extends left to right in FIG. 6. FIG. 7 is a sectional view taken along a line A-A in FIG. 6 and is thus a chord wise section across the joint, in other words the chord of the wing extends left to right in FIG. 7. The inner surface 25 of the skin 24 is parallel with the planar welding face 11 when viewed in the span wise section of FIG. 6, but in the section of FIG. 7 the surfaces 25 and 12 lies at an angle to the welding face 11. Note that the angle between the surfaces 25, 11 is exaggerated in FIG. 7 for purposes of illustration. As shown in FIG. 7, the prongs 13 extend at right angles to the surfaces 12, 25 (instead of extending at right angles to the surface 11). Note that as well as extending at an angle to the planar welding face 11, the surfaces 25, 12 may also be slightly curved.

Thus the distance between the two sides 11, 12 of the welding pad varies across the array as shown in FIG. 7. In this case the welding pad is wedge shaped, being relatively thin on the left hand side and relatively thick on the right hand side, as viewed in FIG. 7. The additive manufacturing process lends itself to the precise formation of a welding interface element with such a complex shape.

Figure 8:
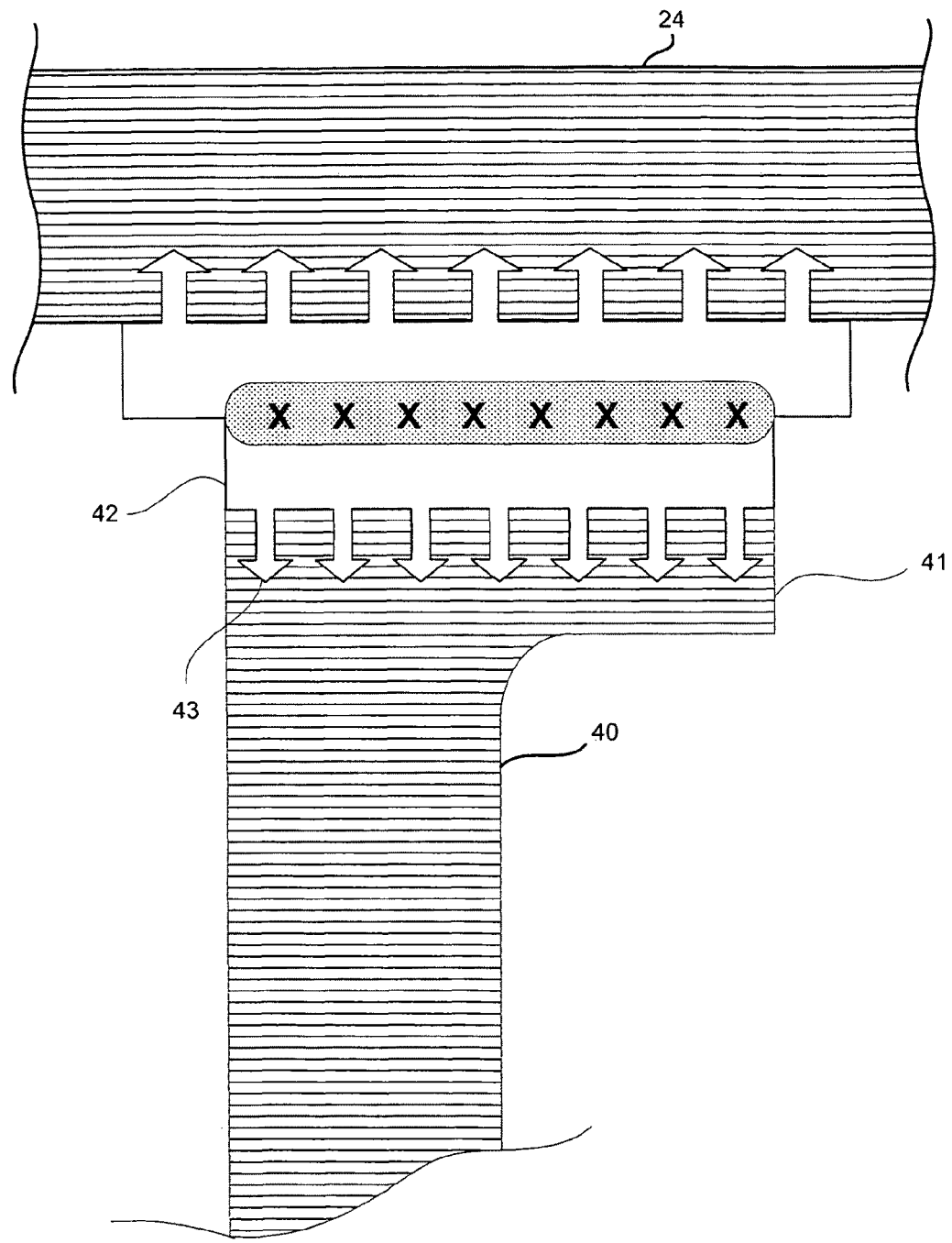
FIG. 8 is a sectional view of a cover/rib joint formed with a pair of back-to-back welding interface elements.

FIG. 8 shows a joint with a pair of back-to-back welding interface elements joining a thermoset wing cover 24 to a thermoset rib. The wing cover 24 and welding interface element 1 are identical to the corresponding components described above with reference to FIG. 1 to 7. However instead of being joined to a thermoplastic rib, in this case the wing cover is joined to a rib comprising a web 40 and a flange 41 which are both formed integrally from a thermoset material such as epoxy resin. The flange 41 is formed from a plurality of layers of carbon fibres impregnated with a thermosetting matrix, and a thermoplastic welding interface element 42 is joined to the flange 41 by an array of pointed prongs 43 embedded within one or more of the layers of fibres. The lower welding interface element 42 is manufactured by the same additive process as the upper welding interface element 1 and also attached to the rib by the same process.

Figure 9:
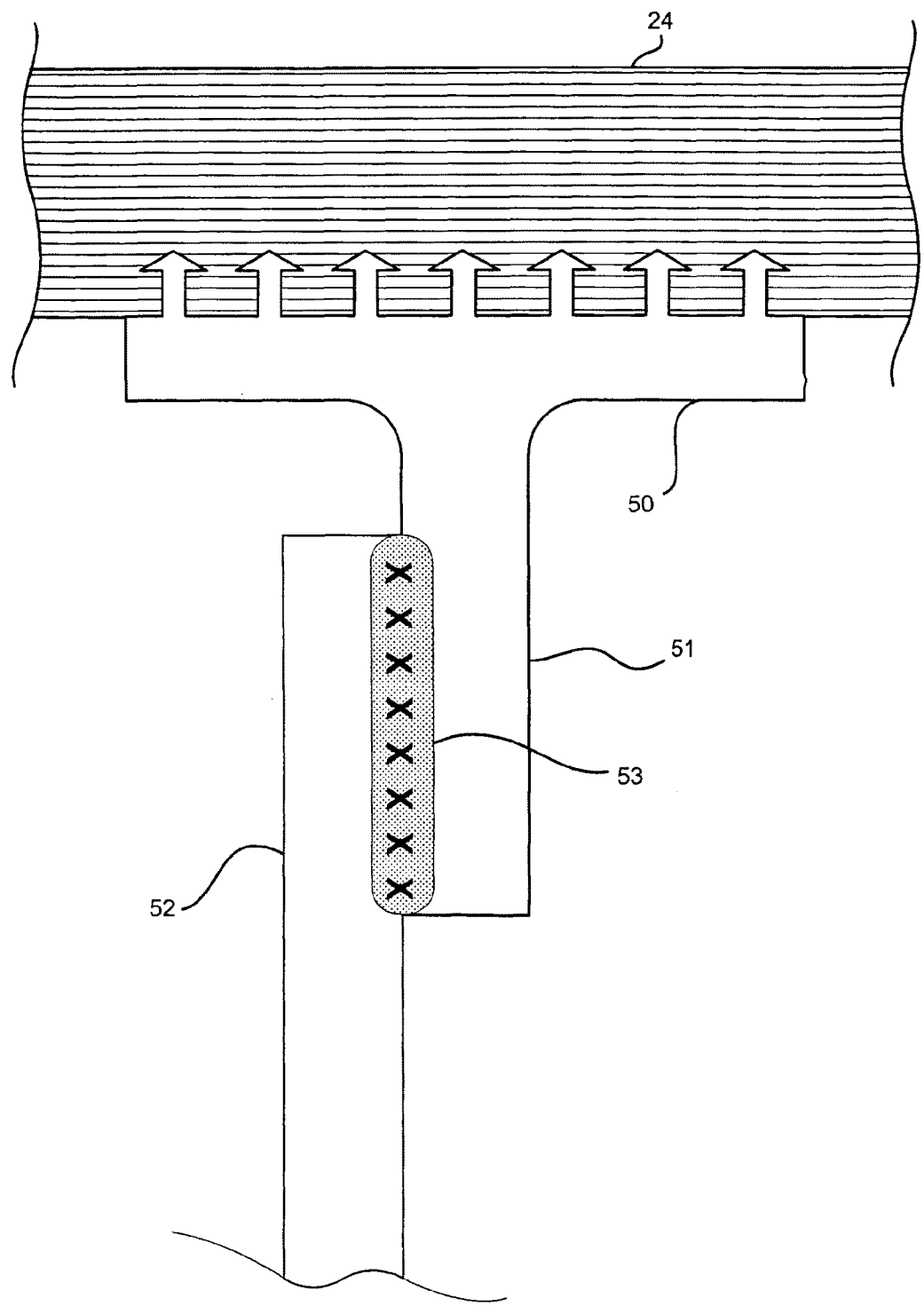
FIG. 9 is a sectional view of a cover/rib joint with an alternative welding interface element.

FIG. 9 shows a rib/cover joint with an alternative welding interface element. In this case the welding interface element comprises a horizontal foot 50 which carries the array of pointed prongs; and a blade 51 which extends vertically from the foot and is welded to a thermoplastic rib 52 by a thermoplastic weld 53. Because the thermoplastic weld 53 runs parallel with the rib 52 instead of running parallel with the wing cover 24; there are fewer peeling issues at the thermoplastic weld 53.

Figure 10:
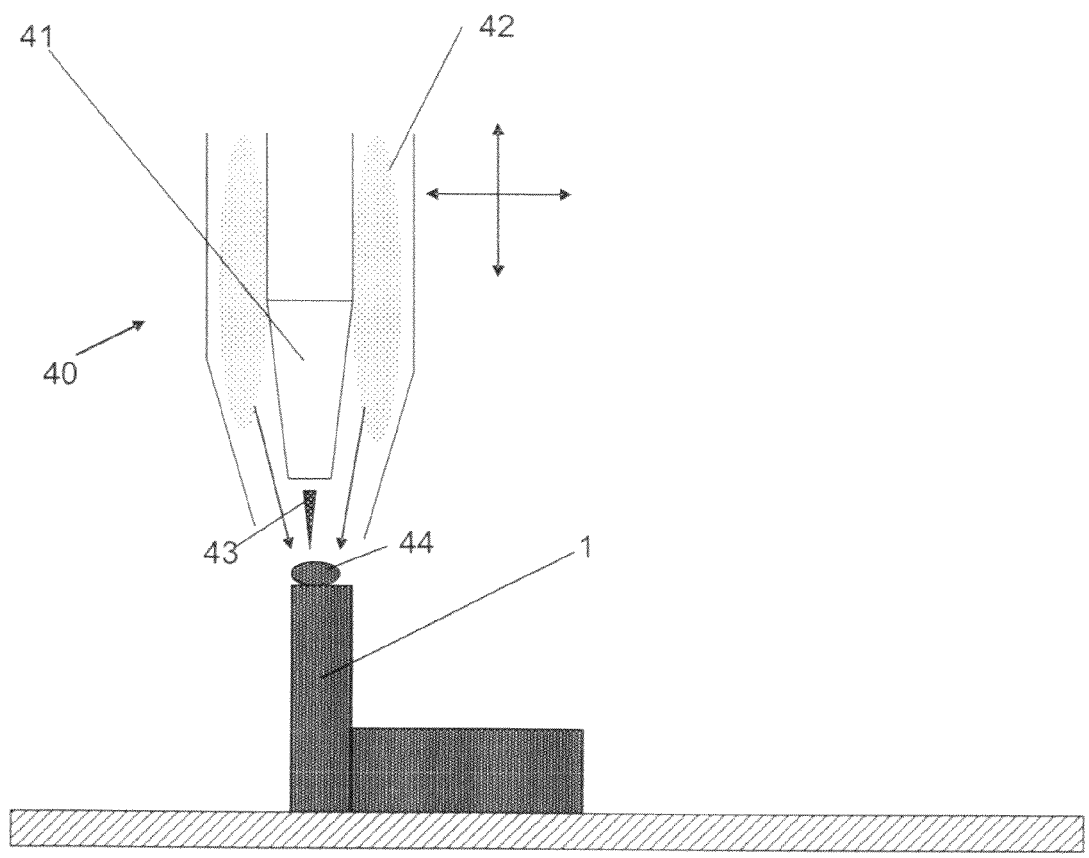
FIG. 10 illustrates a powder feed additive method of manufacturing a welding interface element.

Instead of being formed in a powder bed process as shown in FIG. 1, each prong of the welding interface element may alternatively be grown in a series of layers by a powder feed process as shown in FIG. 10. The powder feed fabrication system shown in FIG. 10 can be used to build up the prongs 1 on a previously manufactured welding pad.

The powder feed fabrication system comprises a movable head 40 with a laser 41 and an annular channel 42 around the laser 41. Un-fused thermoplastic polymer powder flows through the channel 42 into the focus of the laser beam 43. As the powder is deposited, it melts to form a bead 44 which becomes consolidated with the existing material.

In contrast to the powder bed system of FIG. 1, the powder feed system of FIG. 10 directs powder to only the selected parts of the build surface, and fuses the powder as it is delivered. Therefore the powder feed mechanism produces structures that are unsupported by powder, and so supports (not shown) may need to be built integrally into the part and machined off later, in particular where the prongs have large overhanging parts.

The head 40 may be the only moving feature in the process, or the part may be rotated during fabrication. In other words, the head 40 directs powder to selected parts of the build surface region with the part in a first orientation relative to the head 40; the part is rotated so that it adopts a second orientation relative to the head 40; and the head then directs material to selected parts of the build surface with the part in the second orientation. This facilitates the manufacturing of complex shapes without the need for removable supports. For instance overhanging features can be formed by rotating the part between layers in order to always ensure that the element being built is at no more than 30 degrees from the vertical. As the build area is at a temperature significantly below the melting point of the material, the area being built will only need to maintain a supportable angle for a brief time after the laser energy is removed in order for it to solidify enough to become self supporting. If the projections are built in a parallel sequence then it is possible to re-orientate the part between each layer to enable unsupported overhanging features to be built.

Although the invention has been described above with reference to one or more preferred embodiments, it will be appreciated that various changes or modifications may be made without departing from the scope of the invention as defined in the appended claims.

The invention claimed is:

1. A method of forming a joint between a first component and a second component, the first component comprising a plurality of layers of fibres impregnated with a thermosetting matrix, the method comprising:
   a. providing a welding interface element with an array of pointed prongs;
   b. penetrating one or more of the layers of fibres with the prongs, either before or after the fibres have been impregnated with the thermosetting matrix,
   c. curing the first component after step b. by heating the thermosetting matrix; and
   d. forming a thermoplastic weld between the second component and the welding interface element.

2. The method of claim 1 wherein step d. is performed after step c and/or step b.

3. The method of claim 1 wherein the welding interface element comprises a welding pad with a substantially planar welding face; and wherein only part of the welding face is welded to the second component in step d.

4. The method of claim 1 wherein the welding interface element comprises a welding pad which carries the array of pointed prongs, and wherein the thermoplastic weld is formed between the second component and the welding pad.

5. The method of claim 1 further comprising growing the array of pointed prongs in a series of layers by additive fabrication, each layer being grown by directing energy and/or material from a head to selected parts of a build surface.

6. A joint comprising:
- a first component comprising a plurality of layers of fibres impregnated with a thermosetting matrix;
- a welding interface element with an array of pointed prongs embedded within the first component; and
- a second component welded to the welding interface element by a thermoplastic weld.

7. The joint of claim 6 wherein the welding interface element comprises a welding pad which carries the array of pointed prongs, and wherein the thermoplastic weld is formed between the second component and the welding pad.

8. The joint of claim 6 wherein the welding interface element comprises a welding pad with a substantially planar welding face; and wherein the thermoplastic weld extends across only part of the welding face.

9. The joint of claim 6 further comprising a heating element embedded within the joint proximate the thermoplastic weld.

10. The joint of claim 6 wherein the second component comprises a body; and
- a flange which extends from the body and is welded to the welding interface element.

11. The joint of claim 6 wherein the welding interface element comprises a foot which carries the array of pointed prongs; and a blade which extends from the foot and is welded to the second component.

12. The joint of claim 6 wherein the first component is a cover of an aircraft wing.

13. A welding interface element comprising a welding pad with a welding face on a first side of the welding pad; and an array of pointed prongs which extend from a second side of the welding pad opposite the first side, wherein the welding pad and the prongs are formed from the same thermoplastic polymer material, and wherein the welding pad is wedge-shaped.

14. A method of manufacturing a welding interface element, the welding interface element comprising a welding pad with an array of pointed prongs, wherein the welding pad and the prongs are formed from the same thermoplastic polymer material, the method comprising growing the welding pad and the array of pointed prongs in a series of layers by additive fabrication, each layer being grown by directing energy and/or material from a head to selected parts of a build surface.

15. The method of claim 14 wherein the welding pad and the array of pointed prongs are grown by building up a series of layers of fused thermoplastic polymer powder.

16. The method of claim 15 wherein the welding pad and the array of pointed prongs are formed by depositing a series of beds of thermoplastic polymer powder on the build surface; and directing energy from the head to selected parts of each bed.

17. The method of claim 15 wherein the welding pad and the array of pointed prongs are grown by directing fused thermoplastic powder from a head to selected parts of the build surface.

* * * * *